US008549051B2

(12) United States Patent
Ahrens et al.

(10) Patent No.: US 8,549,051 B2
(45) Date of Patent: Oct. 1, 2013

(54) UNLIMITED FILE SYSTEM SNAPSHOTS AND CLONES

(75) Inventors: Matthew A. Ahrens, San Francisco, CA (US); Mark J. Maybee, Boulder, CO (US); Jeffrey S. Bonwick, Los Altos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1843 days.

(21) Appl. No.: 11/513,800

(22) Filed: Aug. 31, 2006

(65) Prior Publication Data

US 2007/0106706 A1    May 10, 2007

Related U.S. Application Data

(60) Provisional application No. 60/734,039, filed on Nov. 4, 2005.

(51) Int. Cl.
*G06F 12/00* (2006.01)
*G06F 17/30* (2006.01)

(52) U.S. Cl.
USPC ......................................................... 707/829

(58) Field of Classification Search
USPC .................. 707/100, 203, 999.1, 999.203
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |

(Continued)

OTHER PUBLICATIONS

Sandberg, R. et al.; "Design and Implementation of the Sun Network Filesystem"; Sun Microsystems, Inc., 1985 USENIX Conference (12 pages).

(Continued)

*Primary Examiner* — Alexey Shmatov
(74) *Attorney, Agent, or Firm* — Osha Liang LLP

(57) ABSTRACT

The invention relates to a system that includes a file system configured to create a snapshot of a hierarchical block tree (HBT) and a storage pool. After the snapshot has been created, the storage pool includes a snapshot, where the snapshot includes a copy of a first version of a root block and the HBT, where the HBT includes a second version of the root block. Further, the copy of the first version of the root block is created prior to overwriting the first version of the root block with the second version of the root block, the second version of the root block comprises references to a first block and a second block, and the copy of the first version of the root block comprises a reference to the first block and no reference to the second block.

11 Claims, 11 Drawing Sheets

(56) References Cited

U.S. PATENT DOCUMENTS

| | | | |
|---|---|---|---|
| 6,981,114 B1 | 12/2005 | Wu et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 7,236,987 B1* | 6/2007 | Faulkner et al. | 707/104.1 |
| 7,313,720 B1 | 12/2007 | Eng et al. | |
| 7,430,568 B1* | 9/2008 | DeKoning et al. | 707/200 |
| 2002/0004883 A1 | 1/2002 | Nguyen et al. | |
| 2002/0055942 A1 | 5/2002 | Reynolds | |
| 2002/0087788 A1 | 7/2002 | Morris | |
| 2002/0161972 A1 | 10/2002 | Talagala et al. | |
| 2003/0033477 A1 | 2/2003 | Johnson et al. | |
| 2003/0110469 A1* | 6/2003 | Jackson | 717/113 |
| 2003/0126107 A1 | 7/2003 | Yamagami | |
| 2003/0145167 A1 | 7/2003 | Tomita | |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0225834 A1 | 11/2004 | Lu et al. | |
| 2004/0234000 A1 | 11/2004 | Page | |
| 2005/0010620 A1 | 1/2005 | Silvers et al. | |
| 2005/0097270 A1 | 5/2005 | Kleiman et al. | |
| 2005/0235154 A1 | 10/2005 | Serret-Avila | |
| 2006/0168409 A1 | 7/2006 | Kahn et al. | |
| 2006/0218135 A1* | 9/2006 | Bisson et al. | 707/4 |
| 2006/0218644 A1 | 9/2006 | Niles et al. | |
| 2006/0256965 A1 | 11/2006 | Rowe | |

OTHER PUBLICATIONS

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Austin, B.; "A Dynamic Disc Allocation Algorithm Designed to Reduce Fragmentation During File Reloading"; Information Sciences Laboratory, Corporate Research and Development Center, General Electric Company, 1970 (4 pages).

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

\* cited by examiner

UNLIMITED FILE SYSTEM SNAPSHOTS AND CLONES

CROSS REFERENCE TO RELATED APPLICATIONS

This application claims benefit of U.S. Provisional Application Ser. No. 60/734,039 filed on Nov. 4, 2005, entitled "UNLIMITED FILESYSTEM SNAPSHOTS AND CLONES" in the names of Matthew A. Ahrens, Mark J. MAYBEE, and Jeffrey S. Bonwick.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853,915) filed on May 26, 2004; "Multiple Replication Levels with Pooled Devices" (Application Ser. No. 60/733,848) filed on Nov. 4, 2005; "Multiple Replication Levels with Pooled Devices" (application Ser. No. 11/406,956) filed on Apr. 19, 2006; "Method and System Supporting Per-File and Per-Block Replication" (application Ser. No. 11/406,850) filed on Apr. 19, 2006; "Ditto Blocks" (application Ser. No. 11/406,590) filed on Apr. 19, 2006; and "Method and System for Adaptive Metadata Replication" (application Ser. No. 11/406,957).

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems.

File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file, each time the file is extended (i.e., modified via a write request to add information). Whereas extent-based allocation creates a large series of contiguous blocks (i.e., extents) each time the file exhausts the space available in the last extent of the file.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

SUMMARY

In general, in one aspect, the invention relates to a system. The system includes a file system configured to create a snapshot of a hierarchical block tree (HBT) and a storage pool. After the snapshot has been created, the storage pool includes the snapshot comprising a copy of a first version of a root block, the HBT comprising a second version of the root block, and wherein the copy of the first version of the root block is created prior to overwriting the first version of the root block with the second version of the root block, wherein the second version of the root block comprises references to a first block and a second block, and wherein the copy of the first version of the root block comprises a reference to the first block and no reference to the second block.

In general, in one aspect, the invention relates to a computer readable medium comprising computer executable instructions for creating a snapshot of a hierarchical block tree (HBT). The executable instructions including instructions for obtaining a copy of a first version of a root block of the HBT prior to overwriting the first version of the root block with a second version of the root block, instructions for designating the copy of a first version of a root block as a root block of the snapshot, instructions for associating a dead list of the HBT with the snapshot, instructions for overwriting the first version of the root block with a second version of the root block, and instructions for associating the HBT with an empty dead list, wherein the HBT comprises the second version of the root block.

Other aspects of the invention will be apparent from the following description and the appended claims.

DETAILED DESCRIPTION

Figure 1:
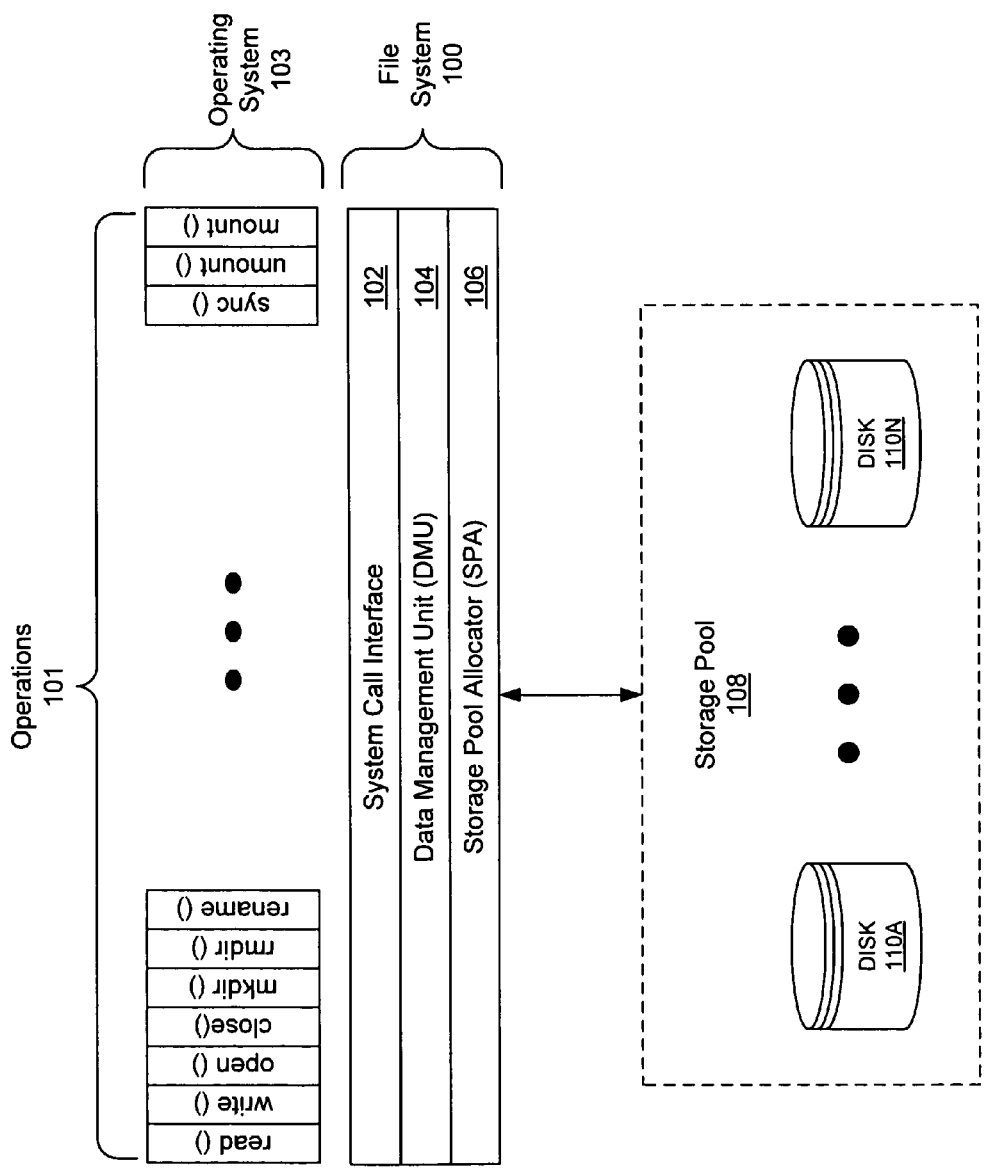
FIG. 1 shows a system architecture in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for creating snapshots of a hierarchical block tree. Further, embodiments of the invention relate to a method and apparatus for creating clones of the snapshots.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (110A-110N). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
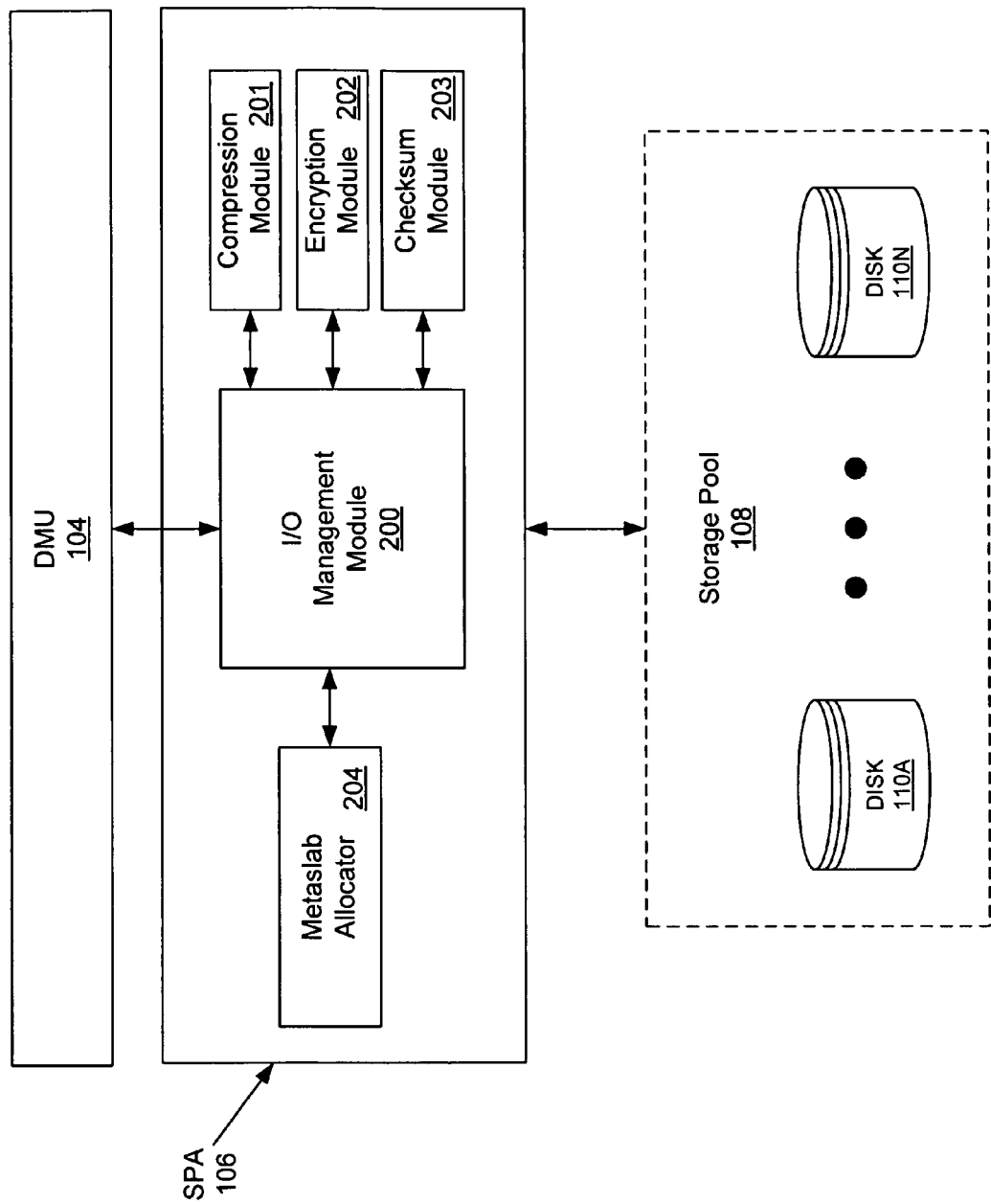
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules are described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
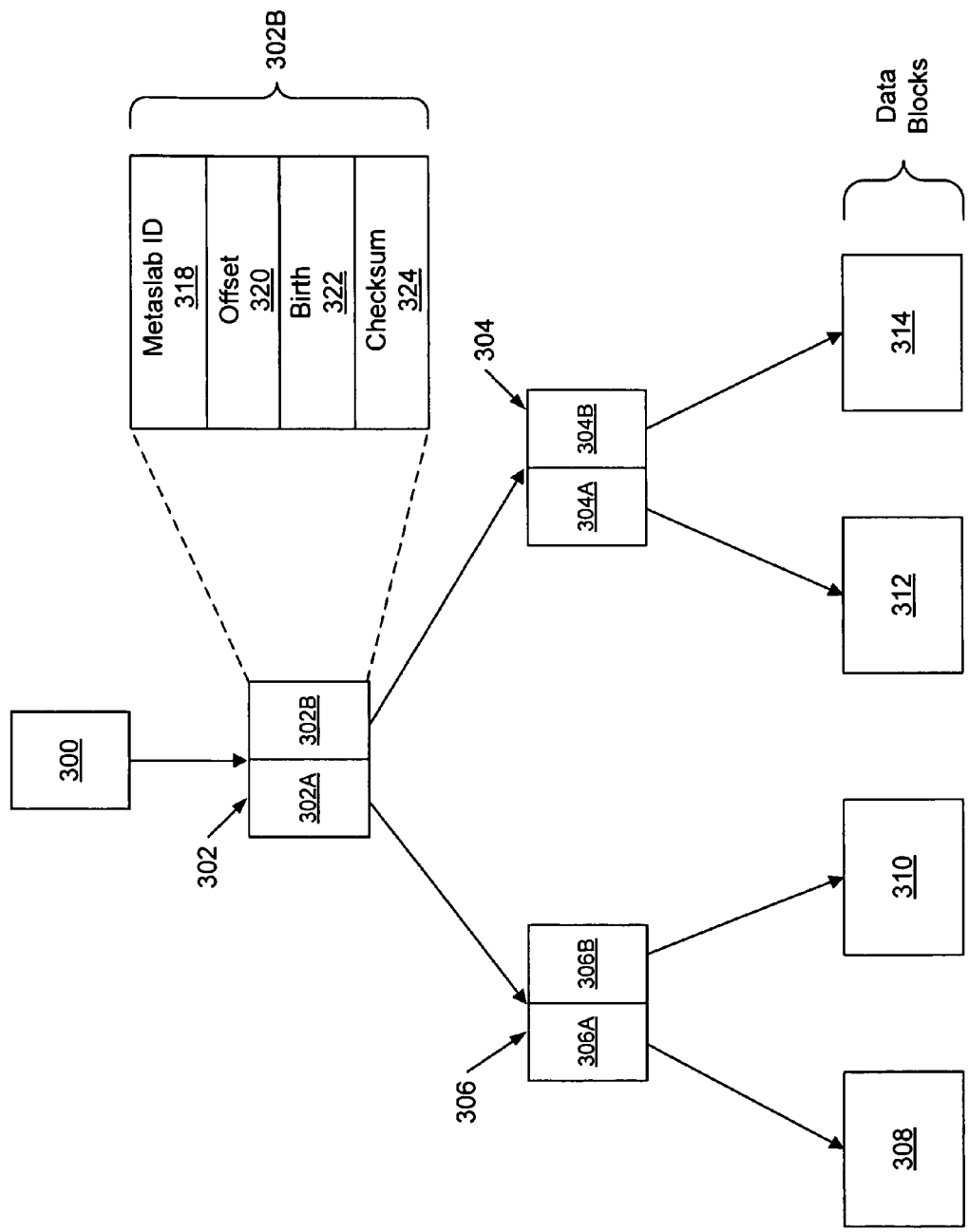
FIG. 3 shows a hierarchical block tree in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical block tree (hereinafter referred to as a "HBT") for storing data blocks and indirect blocks within the storage pool in accordance with one embodiment of the invention. In one embodiment of the invention, the HBT includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The HBT may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all of the modified data blocks in the HBT to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes (i.e., overwrites) the root block to reference the indirect blocks referencing the modified data block.

Using the infrastructure shown in FIGS. 1-3, the following discussion describes the creation of a snapshot of the HBT and the creation of a clone from the snapshot.

In one embodiment of the invention, the HBT corresponds to a group of blocks referenced, directly or indirectly, by a root block. As discussed above, as the blocks referenced by the root block are modified, the modified blocks are written to unused locations in the storage pool and the root block is modified to include references to the modified blocks.

A snapshot corresponds to a state of the HBT at a given time, where the state of the HBT corresponds to all blocks referenced, directly or indirectly, by the root block of the HBT at the aforementioned time.

In one embodiment of the invention, a clone corresponds to an HBT where the initial state of the clone is obtained from a snapshot of the HBT. Said another way, the clone corresponds to a pre-populated HBT where the clone initially includes only blocks referenced, directly or indirectly, by the root block of the HBT at the time the snapshot was created. In one embodiment of the invention, file system may also create snapshot(s) of the clones.

Figure 4:
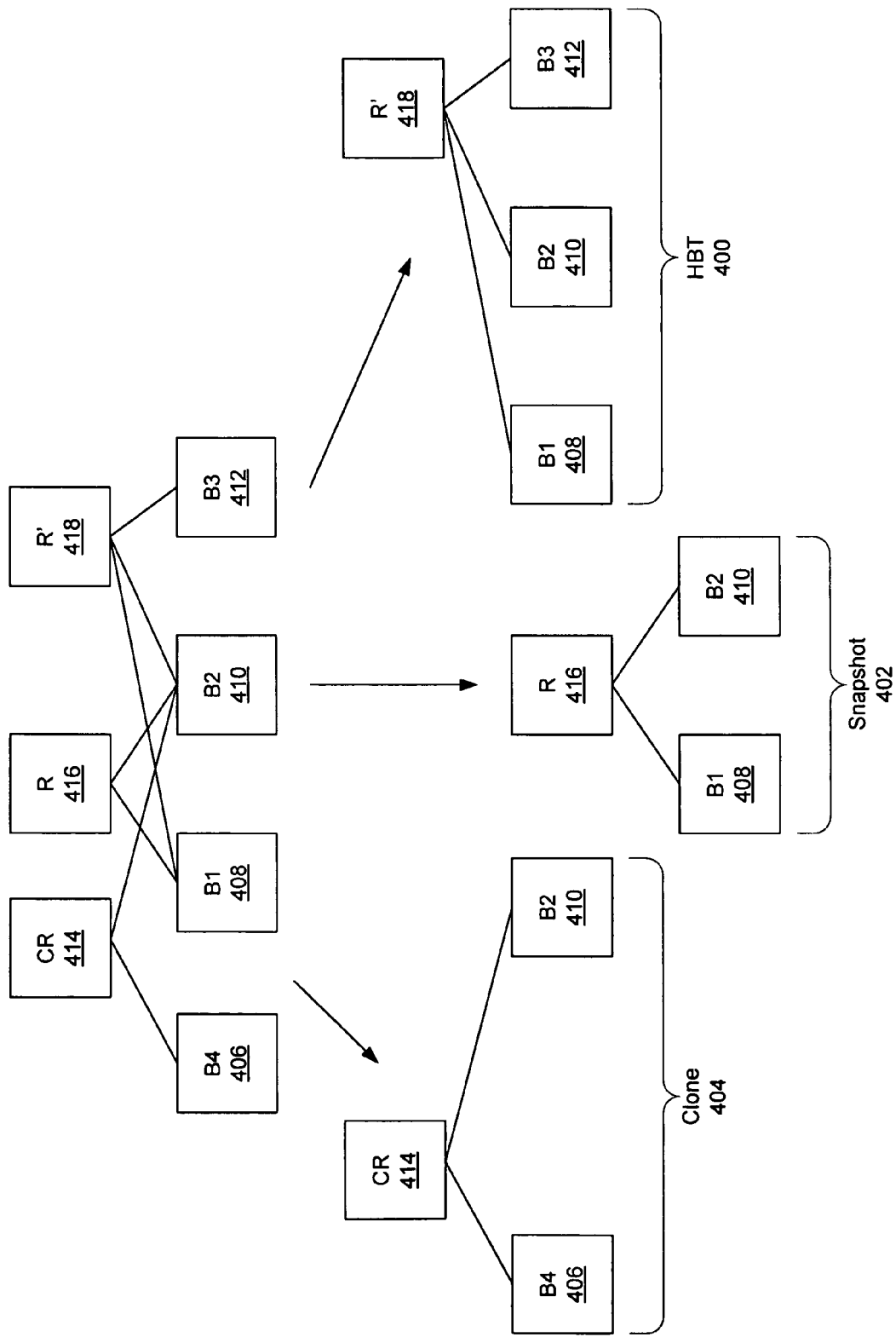
FIG. 4 shows a hierarchical block tree, a snapshot, and a clone in accordance with an embodiment of the invention.

In one embodiment of the invention, the HBT and the clone may each be modified independently. For example, modifying the contents of the HBT will not affect the clone and vise versa. Further, the file system is configured to manage HBTs, snapshots and clones concurrently. For example, FIG. 4 shows a hierarchical block tree, a snapshot, and a clone in accordance with an embodiment of the invention. As shown in FIG. 4, each block (e.g., B1 (408), B2 (410), B3 (412), B4 (406)) may be referenced by, and therefore be a part of, the HBT (400), the snapshot (402), and the clone (404).

Specifically, the HBT (400) includes a second version of the root block R' (418). The second version of the root block R' (418) in turn references blocks B1 (408), B2 (410), and B3 (412). Further, the snapshot (402) includes a first version of the root block R (416). The first version of the root block R (416) in turn references blocks B1 (408) and B2 (410). Finally, the clone (404) includes a copy of the first version of the root block CR (i.e., the clone root block) (414). The clone root block CR (414) in turn references blocks B2 (408) and B4 (406).

As discussed above, the snapshot of the HBT correspond to the state of the HBT at a given time. Accordingly, in FIG. 4, the snapshot (402) corresponds to the state of the HBT (400) prior to the addition of block B3 (412) to the HBT (400).

Similarly, as discussed above, the initial state of the clone corresponds to the snapshot. Accordingly, in FIG. 4, the initial state of the clone (404) (i.e., the blocks initially referenced by the clone root block CR (414)) are blocks B1 (406) and B2 (408).

Finally, as discussed above, the clone and the HBT may be modified independently of one another. As shown in FIG. 4, the clone (404) is modified to remove the reference to block B1 (408) and to add a reference to block B4 (406). The removal of the reference to block B1 (408) from the clone (404) did not affect the reference to block B1 (408) by the HBT (400).

In one embodiment of the invention, the HBT (400) and the snapshot (402) are each associated with their own dead list (not shown). In one embodiment of the invention, the dead list associated with the HBT (400) is initially empty. As the HBT is modified, the dead list associated with the HBT is updated to list all block pointers (along with the referenced birth time of the block) corresponding to blocks which are referenced in the snapshot (402), but are no longer referenced in the HBT (400). Further, the dead list associated with the snapshot (402) corresponds to the dead list associated with the HBT (400) at the time the snapshot was created.

In one embodiment of the invention, the clone is also associated with a dead list (not shown). When the clone (404) is initially created, its dead list is empty. As the clone (404) is modified, the dead list associated with the clone (404) is updated to list all block pointers (along with the referenced block's birth time) corresponding to blocks which are referenced in the snapshot (402), but are no longer referenced in the clone (404). Dead lists are further discussed below in FIGS. 7 and 8.

Figure 5A:
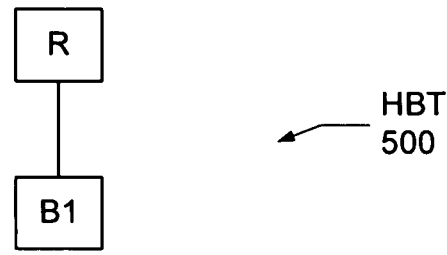
FIGS. 5A-5F show examples to illustrate one or more embodiments of the invention.
Figure 5B:
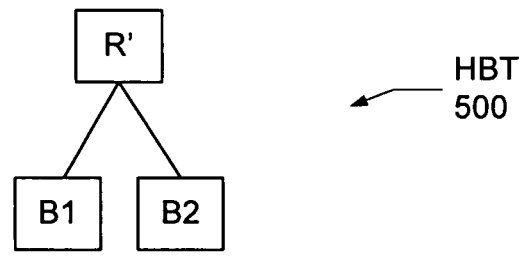

FIG. 5A-5F show examples to illustrate one or more embodiments of the invention. More specifically, FIGS. 5A-5F show an example of the creation of an HBT, a snapshot, and a clone in accordance with one embodiment of the invention. Referring to FIG. 5A, the HBT (500) initially includes a root block (R) and block (B1), where R references B1. Referring to FIG. 5B, HBT (500) is subsequently modified to include a reference to block (B2). In accordance with the copy-on-write mechanism implemented by the file system, R (in FIG. 5A) is overwritten with a modified copy of the root block (R'), where the R' references both B1 and B2.

Figure 5C:
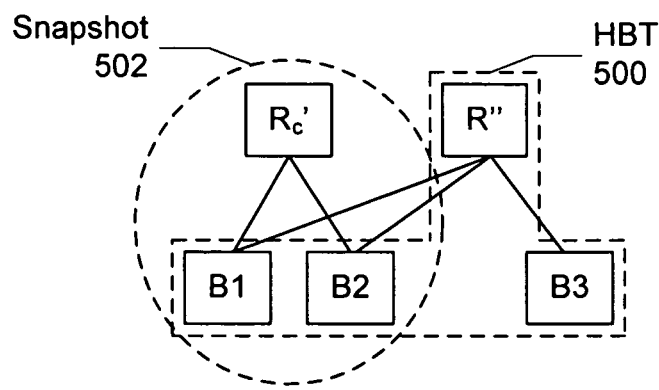

Referring to FIG. 5C, at some later point in time a snapshot (502) of HBT (500) is created. The snapshot (502) is created prior to modifying R' to obtain R", where R" is a modified version of R' and references B1, B2 and block (B3). As shown in FIG. 5C, the snapshot (502) includes a copy of R' (denoted as $R_c'$). $R_c'$ references B1 and B2. Note that the snapshot (502) does not include an additional copy of B1 and B2.

Figure 5D:
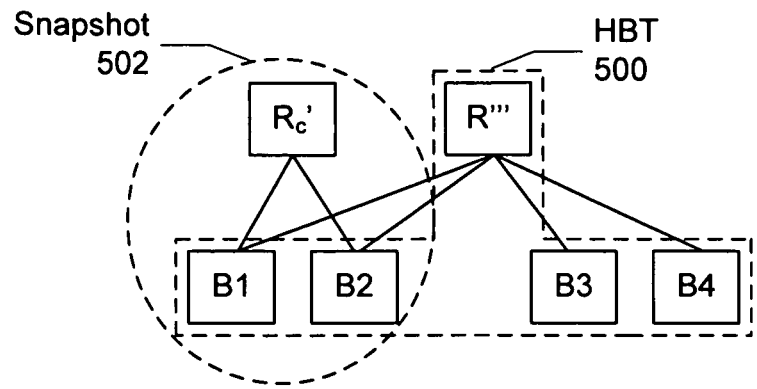

Referring to FIG. 5D, HBT (500) is subsequently modified to include a reference to block (B4). In accordance with the copy-on-write mechanism implemented by the file system, R" (in FIG. 5C) is overwritten with a modified copy of the root block (R'"), where the R'" references both B1, B2, B3 and B4.

Figure 5E:
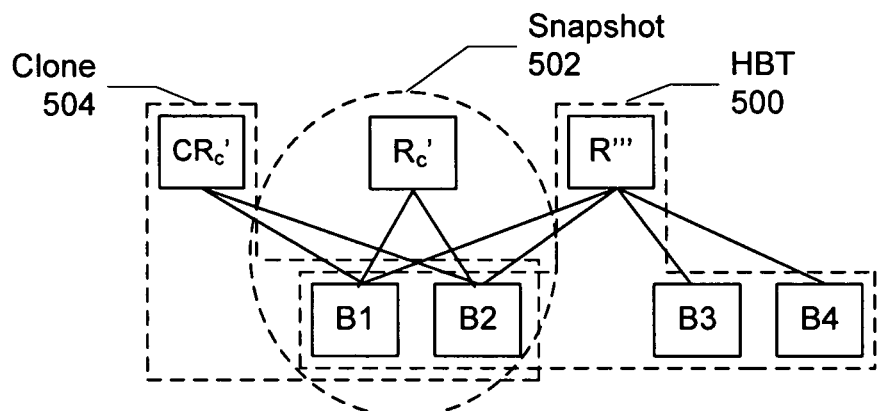

Referring to FIG. 5E, at some later point in time, a clone (504) is created from the snapshot (502). As shown in FIG. 5E, the clone (504) includes a copy of R' (denoted as $CR_c'$). $CR_c'$ references B1 and B2. Note that the clone (504) does not include an additional copy of B1 and B2.

Figure 5F:
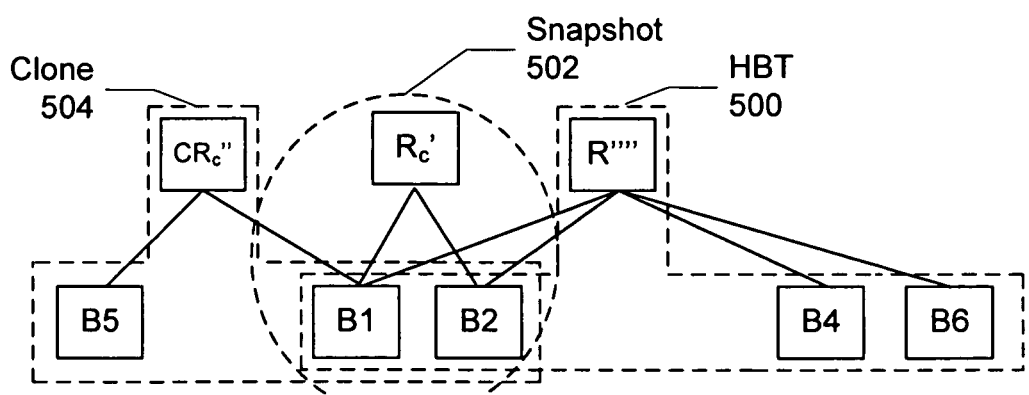

Finally, referring to FIG. 5F, HBT (500) is subsequently modified to delete a reference to B3 and to include a reference to block (B6). In accordance with the copy-on-write mechanism implemented by the file system, R'" (in FIG. 5D) is overwritten with a modified copy of the root block (R""), where the R"" references both B1, B2, B4 and B6. In addition, the clone (504) is modified to delete a reference to B2 and to include a reference to block (B5). In accordance with the copy-on-write mechanism implemented by the file system, $CR_c'$ (in FIG. 5E) is overwritten with a modified copy of the root block ($CR_c''$), where the $CR_c''$ references both B1 and B5.

Figure 6:
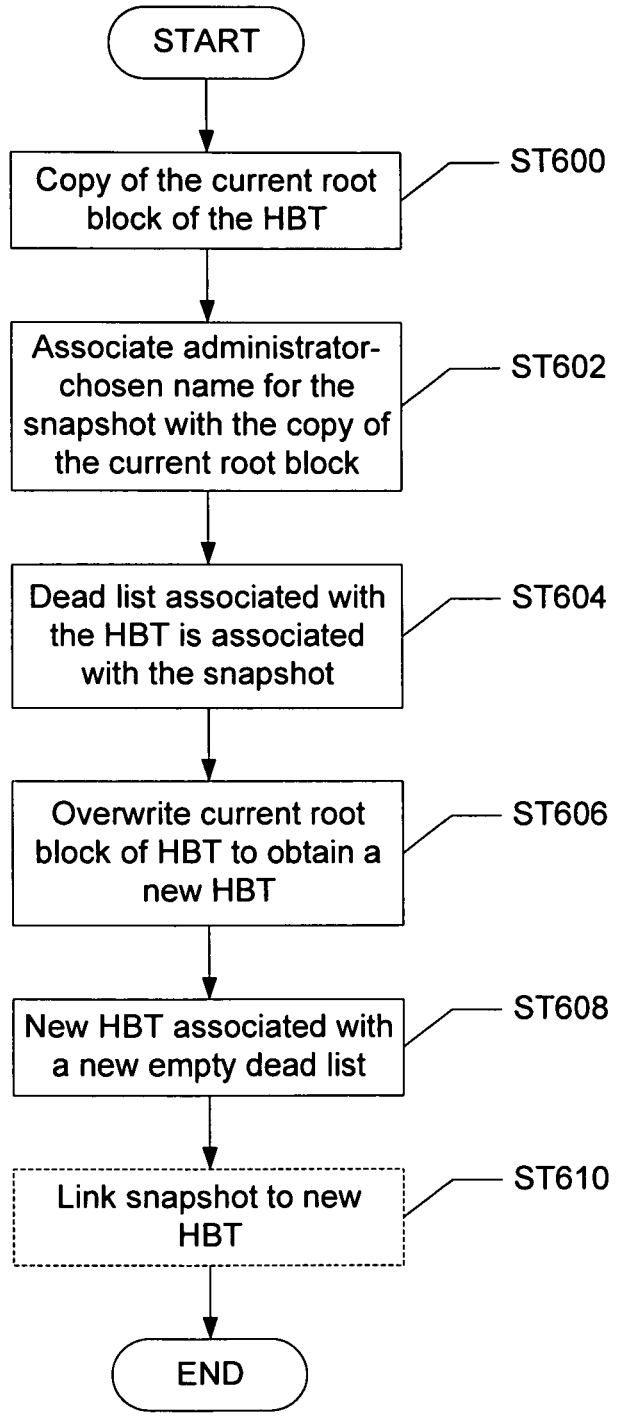
FIG. 6 shows a flow chart in accordance with an embodiment of the invention.

FIG. 6 shows a flow chart in accordance with an embodiment of the invention. More specifically, FIG. 6 shows a method for creating a snapshot in accordance with one embodiment of the invention.

Initially, the current root block of the HBT is copied (ST600). The copy of the current root block is subsequently associated with an administrator-chosen name for the snapshot (ST602). Said another way, the copy of the current root block is designated as the root block of the snapshot, where the snapshot is identified by the administrator-chosen name. The dead list associated with the HBT is subsequently associated with the snapshot (ST604), such that the dead list is no longer associated with the HBT. For example, referring to FIG. 5F, when clone (504) removes its reference to B2, then B2 is placed on the deadlist associated with clone (504).

The current root block is then overwritten with a new version of the root block to obtain a new HBT (ST606). The new HBT is subsequently associated with a new empty dead list (ST608). Finally, the snapshot (or more specifically the root block of the snapshot) is optionally linked to the new HBT (or more specifically the root block of the new HBT) (ST610). In one embodiment of the invention, the snapshot is linked to the HBT using a doubly-linked list.

In one embodiment of the invention, the clone of the snapshot is created using a method similar to one described for creating a snapshot in FIG. 6. However, instead of obtaining a copy of the current root block, the clone is created by obtaining a copy of the root block of the snapshot from which it was created. Further, unlike the dead list associated with the snapshot, the dead list associated with the clone is initially empty. Finally, the clone (or more specifically the root block of the clone) is linked to the snapshot from which it was created. However, unlike the link between the snapshot and the HBT, the link between the clone and the snapshot is an unidirectional link (typically a pointer) from the clone to the snapshot. Accordingly, one cannot traverse from the snapshot to the clone.

In one embodiment of the invention, when the clone is created, a reference count associated with the snapshot is incremented to reflect that a clone of the snapshot has been created. In one embodiment of the invention, the reference count associated with a snapshot is decremented each time a clone created from the snapshot is deleted. In one embodiment of the invention, the referenced count is used by the file system to determine whether the snapshot can be deleted. In one embodiment of the invention, the snapshot cannot be deleted if the reference count is greater than to a threshold value. In one embodiment of the invention, the threshold value is one.

As discussed above, each HBT, snapshot, and clone is associated with a dead list. In one embodiment of the invention, the contents of the dead list associated the HBT(s) and the contents of the dead list associated with the clone(s) may change over time, while the contents of the dead list associated with the snapshot(s) is static. The following discussion describes how the contents of the dead list associated the HBT(s) and the contents of the dead list associated with the clone(s) may change over time.

As discussed above, when the HBT is modified such that it no longer references a given block (e.g., the block is overwritten, or the object that contains it is freed), a determination must be made about whether the block can actually be freed (i.e., reclaimed for storing other data). A block can only be freed if and only if there are no other references to it (i.e., it is not referenced by any snapshot). In order to determine whether there are any references to the block, a comparison of the block's birth time with the birth time of the most recent snapshot (i.e., the most recently created snapshot of the HBT) is performed. In one embodiment of the invention, the most recent snapshot may be determined by traversing the linked list that links the root block of the HBT with the root blocks of its snapshots. The first snapshot encountered in the traversal corresponds to the most recent snapshot.

Returning to the discussion of how to determine whether there are any references to the block, if the birth time of the block is earlier than the birth time of the most recent snapshot, then, at a minimum, the most recent snapshot references the block and, thus, the block cannot be freed. If the block cannot be freed, then the block pointer associated with the block is placed on the dead list of the HBT. Alternatively, if the block's birth time is later than the birth time of the most recent snapshot, then none of the snapshots reference block and, thus, the block can be freed.

Figure 7:
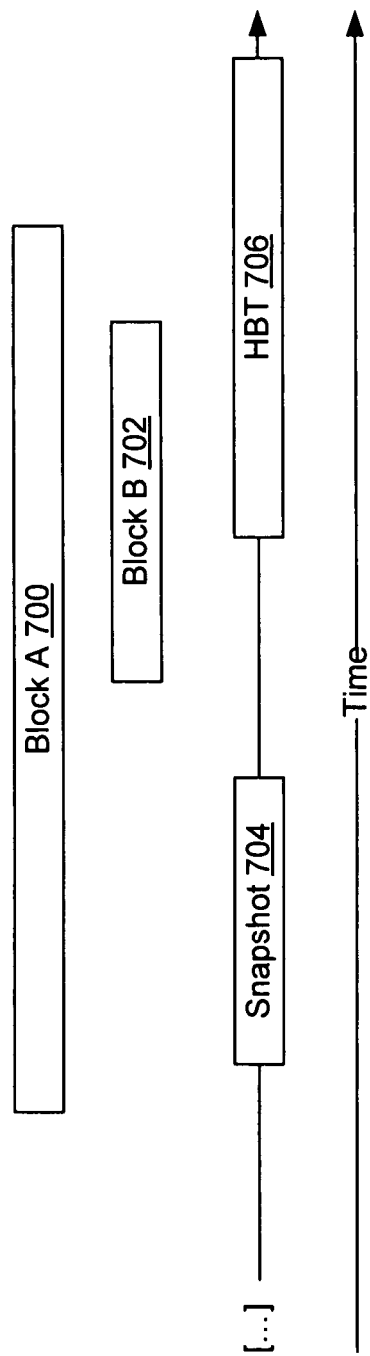
FIG. 7 shows an example of freeing blocks in accordance with an embodiment of the invention.

FIG. 7 shows an example of freeing blocks in accordance with an embodiment of the invention. As shown in FIG. 7, Block A (700) has a birth time that is earlier than the time the most recent snapshot (i.e., snapshot (704)) was created. Further, Block B (702) was born after the time the snapshot (706) was created. If the HBT (706) stops referencing Block A (700), Block A (700) cannot be freed because it was born before the snapshot (704) was created. Accordingly, Block A is placed on the dead list associated with the HBT (700). However, if the HBT (706) stops referencing Block B (702), then Block B (702) can be freed because it was born after the snapshot (704) was created and, thus, is not referenced by the snapshot (704).

In one embodiment of the invention, the file system includes functionality to delete any snapshot in the file system. Once a snapshot has been deleted (i.e., the user deletes the snapshot), a determination must be made about which blocks may be freed and which blocks must be maintained on a dead list prior to completing the deletion of the snapshot.

In one embodiment of the invention, in order to free a block that is referenced in the deleted snapshot, the following constraints must be met: (1) the block was born after the previous snapshot (i.e., the snapshot created immediately prior to the deleted snapshot), (2) the block was born before the deleted snapshot, (3) the block was placed on the dead list after the deleted snapshot was created, and (4) the block died (i.e., was placed on the dead list) before the next snapshot (i.e., the snapshot created immediately after the deleted snapshot) or the block was placed in the dead list associated with the HBT, if the next snapshot corresponds to the HBT. In one embodiment of the invention, if a given block satisfies all four of the aforementioned criteria, then the block is unique to the snapshot.

The blocks on the dead list associated with the next snapshot (or dead list associated with the HBT, if the next snapshot does not exist) are those that meet constraints (2), (3) and (4) (i.e., the blocks live in the deleted snapshot, but are dead in the next snapshot).

Figure 8:
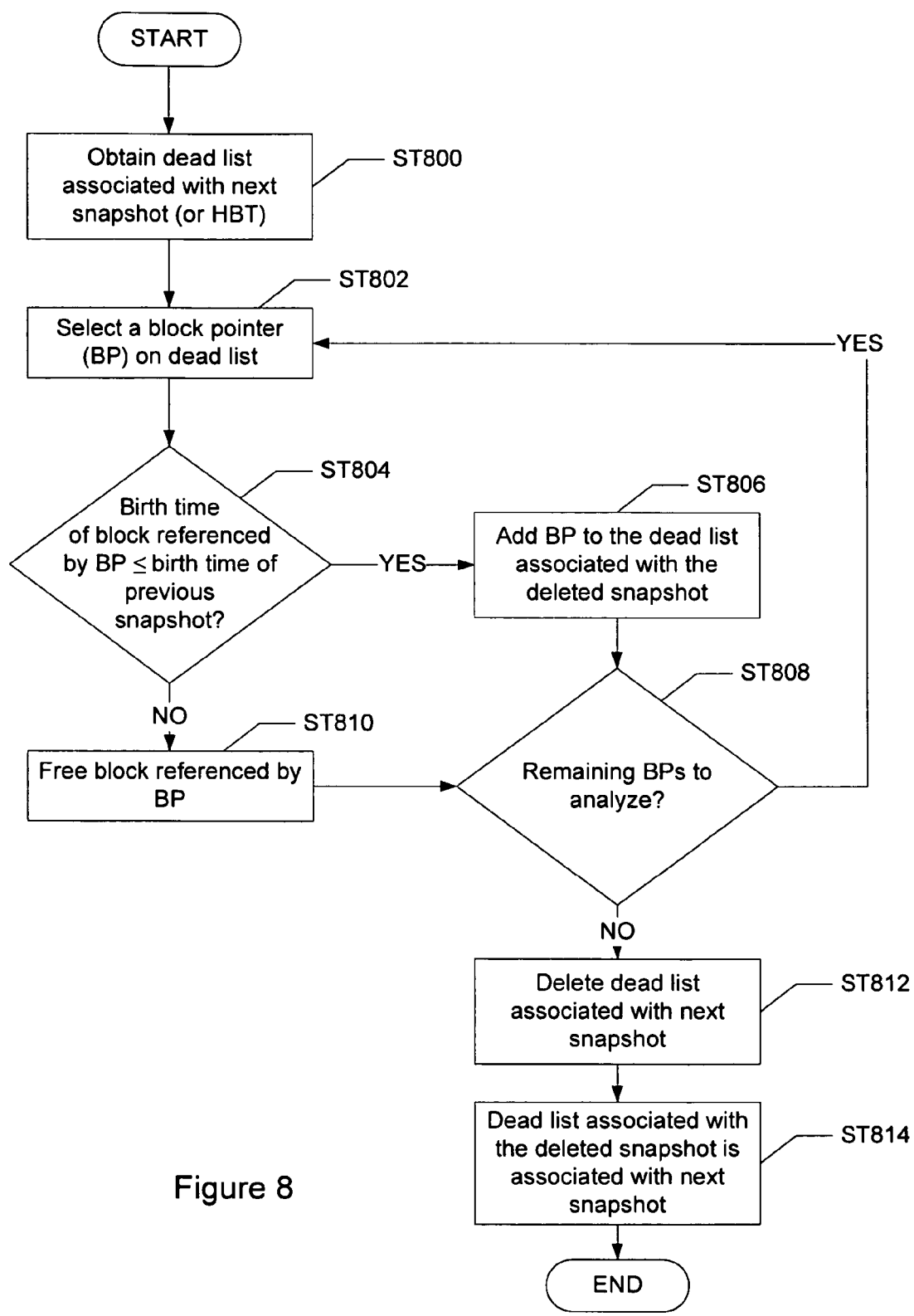
FIG. 8 shows a flow chart in accordance with an embodiment of the invention.

FIG. 8 shows a flow chart in accordance with an embodiment of the invention. More specifically, FIG. 8 describes a method for determine which blocks of the deleted snapshot may be freed. Turning to FIG. 8, initially, the dead list associated with the next snapshot (or HBT) is obtained (ST800). A block pointer (BP) on the dead list is then selected (ST802). A determination is then made about whether the birth time of the block, referenced by the BP, is less than or equal to the birth time of the previous snapshot (ST804). In one embodiment of the invention, the birth time of the previous snapshot corresponds to the birth time of the root block of the previous snapshot.

If the birth time of the block, referenced by the BP, is less than or equal to the birth time of the previous snapshot, then the BP is added to the dead list associated with the deleted snapshot (ST806). If the birth time of the block referenced by the BP is greater than the birth time of the previous snapshot, then the block referenced by the BP is freed (i.e., the block referenced by the BP is now available to be overwritten by new data) (ST810). If there are any remaining BPs on the dead list to analyze then the method proceeds to ST802. Otherwise, the method proceeds to ST812. At ST812, the dead list associated with the next snapshot is deleted. Finally, the dead list associated with the deleted snapshot (which may have been modified in ST806) is associated with the next snapshot.

The method shown in FIG. 8 assumes that the dead list associated with the next snapshot includes at least one BP. However, if the dead list associated with the next snapshot does not include any BPs, then the method in FIG. 8 is not performed.

Figure 9:
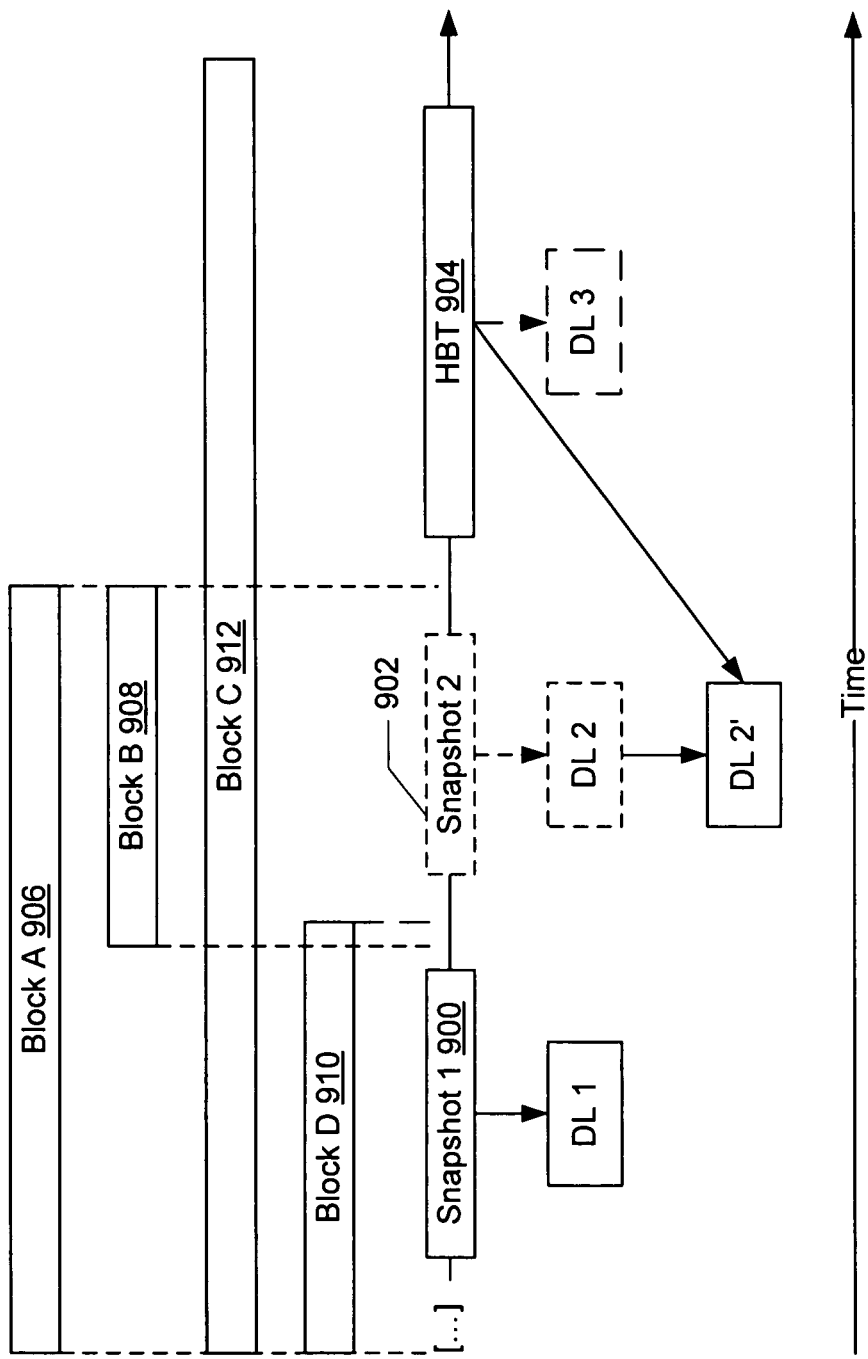
FIG. 9 shows an example of freeing blocks in accordance with an embodiment of the invention.

FIG. 9 shows an example of freeing blocks using the method described in FIG. 8, in accordance with an embodiment of the invention. In the example shown in FIG. 9, snapshot 2 (902) is deleted. Accordingly, prior to completing the deletion of snapshot 2 (902), the dead list (DL3) associated with the HBT (904) must be analyzed in accordance with the method described in FIG. 8.

Prior to analyzing DL3, the following discussion details which of the block pointers corresponding to Block A (906), Block B (908), Block C (910), and Block D (912) is included in DL3. With respect to Block A (906), Block A (906) was born before the snapshot 1 (900) and was deleted after snapshot 2 (902) was created. Thus, Block A (906) is included in DL3. With respect to Block B (908), Block B (908) was born after snapshot 1 (900) and was deleted after snapshot 2 (902) was created, thus, Block B (908) is also included in DL3.

With respect to Block C (912), Block C (912) was born before snapshot 1 (900) and was deleted after HBT (904) was created, thus, Block C (912) is included in DL3. Finally, with respect to Block D (914), Block D (914) was born before snapshot 1 (900) and was deleted before snapshot 2 (902) was created, thus, Block D is on the dead list (DL2) associated with snapshot 2 (902).

At this stage, DL3 includes Block A (906), Block B (908) and Block C (912). Using the method described in FIG. 8, Block A (906) and Block C (912) are placed on DL2 to obtain DL2' (i.e., the result of modifying DL2 to include Block A (906) and Block C (912)) while Block B (908) is freed. The aforementioned results were obtained as follows. With respect to Block A (906), because Block A's birth time is earlier than snapshot 1's birth time, Block A (906) cannot be freed and, thus, is included in a DL2'. With respect to Block B (908), because Block B's birth time is later than snapshot 1's (900) birth time, Block B (908) can be freed. Finally, with respect to Block C (912), because Block C's birth time is earlier than snapshot 1's birth time, Block C (912) cannot be freed and, thus, is also included in DL2'.

At this stage, the dead list (DL3) associated with HTB (904) is deleted and replaced with the dead list (DL2') associated with HBT (904). Once HBT (904) is associated with DL2', the file system may complete the deletion of snapshot 2 (902). Note that DL1 associated with Snapshot 1 (900) is not affected by the deletion of snapshot 2 (902).

In one embodiment of the invention, deleting a snapshot also includes removing the snapshot name from the file system and updating the links between the remaining snapshots and/or HBTs as appropriate.

In one embodiment of the invention, the file system supports "roll back" functionality. In one embodiment of the invention, roll back functionality allows a user to return the contents of the file system (i.e., the HBT) to the state corresponding to a selected snapshot. In one embodiment of the invention, the HBT is rolled back to a state corresponding to a selected snapshot by traversing the HBT and the appropriate snapshots (i.e., the snapshot created after the selected snapshot) and freeing the blocks that were born after the selected snapshot. In one embodiment of the invention, the blocks are freed using the method described above in FIG. 8.

In one embodiment of the invention, the file system implements a copy-on-write mechanism (as discussed above). As such, a block can only reference blocks that are the same age or older than it. Using this property, the aforementioned traversal of the HBT and appropriate snapshots may be optimized by not reading any blocks (or their associated branches) that have a birth time before the selected snapshot.

As discussed above, the clone is a HBT. Thus, the clone, like a HBT, may be associated with its own snapshots. However, when a clone is initially created, the previous snapshot of the clone (for the purpose of deleting the clone) corresponds to the snapshot from which the clone was created.

In one embodiment of the invention, in order to delete a clone, all the snapshots associated with the clone (i.e., the clone's snapshots) must be deleted. Once all the snapshots of the clone are deleted (using the snapshot deletion procedures described above), the clone itself is rolled back to the snapshot from which it was created. At this stage, there are no blocks that are unique to the clone and, thus, the clone can be removed from the file system.

While the above invention has been discussed with respect to a file system managing a single HBT with multiple snapshots and clones, the invention may be extended to include implementations in which there are multiple HBTs each of which is associated with multiple snapshots and clones.

Figure 10:
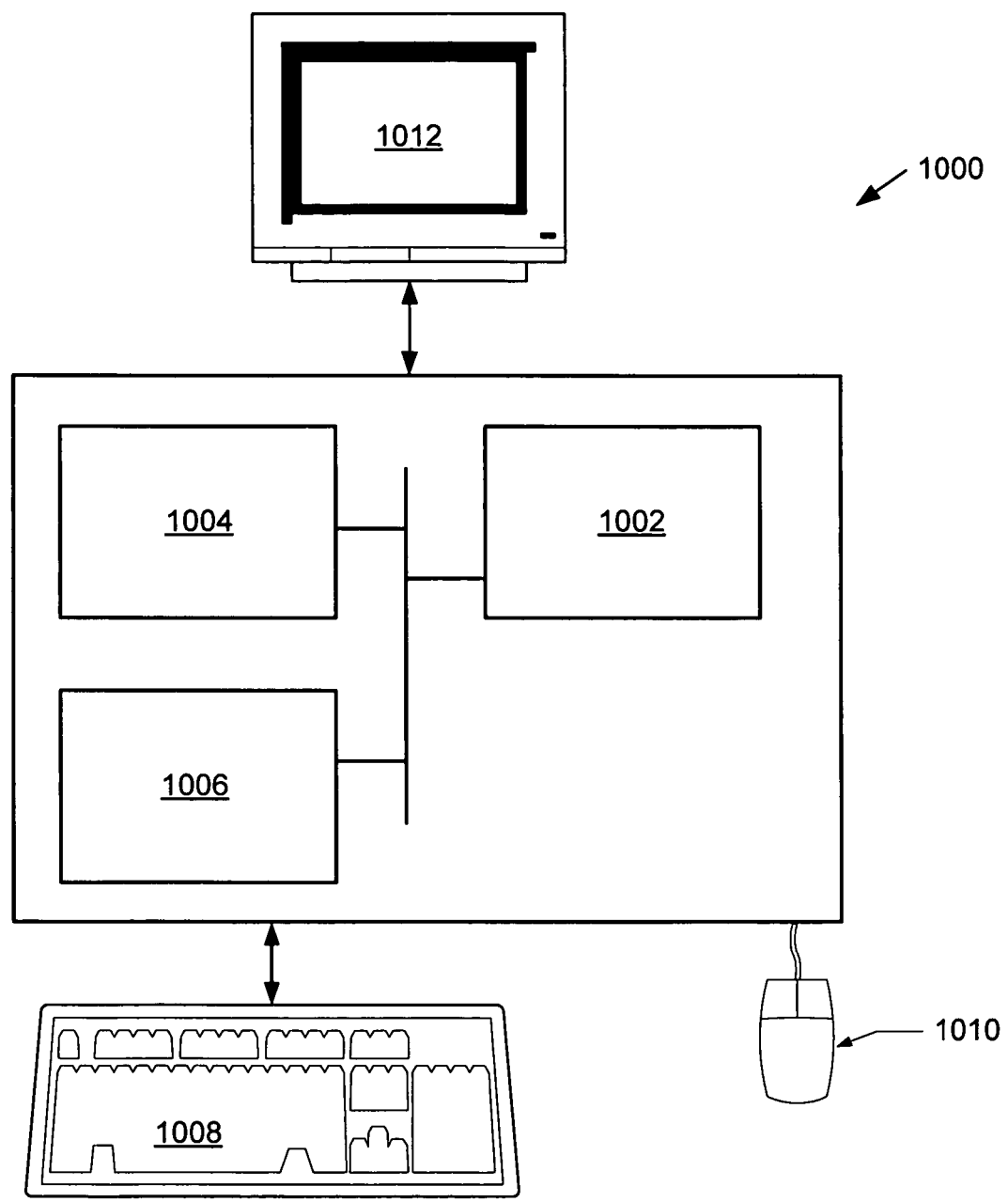
FIG. 10 shows a computer system in accordance with an embodiment of the invention.

The invention may be implemented on virtually any type of computer regardless of the platform being used. For example, as shown in FIG. 10 a networked computer system (1000) includes a processor (1002), associated memory (1004), a storage device (1006), and numerous other elements and functionalities typical of today's computers (not shown). The networked computer system (1000) may also include input means, such as a keyboard (1008) and a mouse (1010), and output means, such as a monitor (1012). The networked computer system (1000) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (1000) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having a computer readable program code embodied therein, said computer readable program code adapted to be executed to perform a method for creating a snapshot of a hierarchical block tree (HBT), said method comprising:

obtaining a copy of a first version of a root block of the HBT prior to overwriting the first version of the root block with a second version of the root block;

designating the copy of a first version of a root block as a root block of the snapshot;

associating an existing dead list of the HBT with the snapshot, wherein the existing dead list specifies a block referenced in a second snapshot and not currently referenced in the snapshot, wherein the second snapshot is associated with the HBT and is created prior to the snapshot;

overwriting the first version of the root block with a second version of the root block;

associating the HBT with an empty dead list, wherein the HBT comprises the second version of the root block; and updating the empty dead list associated with the HBT, wherein the empty dead list is updated when a first block referenced by the root block of the snapshot ceases to be referenced by the second version of the root block, wherein updating the empty dead list associated with the HBT comprises adding a block pointer associated with the first block and a birth time of the first block to the empty dead list.

2. The non-transitory computer readable storage medium of claim 1, said method further comprising:

creating a clone of the snapshot, wherein the clone of the snapshot initially consists of a clone root block, wherein the clone root block corresponds to the copy of the first version of the root block.

3. The non-transitory computer readable storage medium of claim 2, said method further comprising:

performing at least one action selected from a group consisting of adding an additional block to the clone and deleting an existing block from the clone, wherein performing the at least one selected action does not alter the HBT, wherein adding the additional block to the clone comprises overwriting the clone root block to obtain a first modified clone root block and the first modified clone root block comprises a reference to the additional block, and wherein deleting the existing block comprises overwriting the clone root block to obtain a second modified clone root block, wherein the second modified clone root block does not comprise a reference to the existing block.

4. The non-transitory computer readable storage medium of claim 3, said method further comprising:

creating a snapshot of the clone, wherein the snapshot of the clone initially consists of a clone snapshot root block, wherein the clone snapshot root block corresponds to a copy of one selected from a group consisting of the first modified clone root block and the second modified clone root block.

5. The non-transitory computer readable storage medium of claim 2, said method further comprising:
   incrementing a reference count when the clone is created; and
   decrementing the referenced count when the clone of the snapshot is deleted,
   wherein the reference count is associated with the snapshot.

6. The non-transitory computer readable storage medium of claim 2, wherein the snapshot of the HBT is created by a file system.

7. The non-transitory computer readable storage medium of claim 6, wherein the file system is configured to perform at least one action selected from a group consisting of adding an additional block to the clone and deleting an existing block from the clone, and wherein performing the at least one selected action does not alter the HBT.

8. The non-transitory computer readable storage medium of claim 7, wherein adding the additional block to the clone comprises overwriting the clone root block to obtain a modified clone root block, wherein the modified clone root block comprises a reference to the additional block.

9. The non-transitory computer readable storage medium of claim 1, wherein the copy of the first version of the root block and the second version of the root block are linked to each other using a doubly-linked list.

10. The non-transitory computer readable storage medium of claim 1, wherein a block is referenced by the snapshot if a birth time associated with the block is earlier than the birth time associated with the snapshot.

11. The non-transitory computer readable storage medium of claim 10, wherein the birth time of the snapshot corresponds to the birth time of the first version of the root block.

* * * * *